United States Patent Office 3,366,583
Patented Jan. 30, 1968

3,366,583
RUBBER REINFORCING RESINS CATALYZED WITH BF₃-AMINE COMPLEXES
Joan L. Wilson, Akron, Ohio, assignor to The Goodyear Tire & Rubber Company, Akron, Ohio, a corporation of Ohio
No Drawing. Filed July 27, 1965, Ser. No. 475,254
17 Claims. (Cl. 260—3)

ABSTRACT OF THE DISCLOSURE

The disclosure is concerned with catalyzing the formation of a resin in-situ using as the catalyst a sterically hindered $BF_3$ complex in a rubber compound containing a methylene donor and a methylene acceptor capable of reacting with each other to form the resin in-situ.

---

This invention relates to improvements in rubber compounds particularly rubber compounds containing a methylene donor and a methylene acceptor capable of reacting with the donor to form a resin in-situ, and specifically to the use of a sterically hindered boron trifluoride complex, hereinafter referred to as $BF_3$ complex of an organic compound to accelerate the formation of the resin.

It is well known to use rubber in the manufacture of pressure hose, drive belts, and pneumatic tires, but when used in this manner, it is necessary to reinforce the rubber with a cord made of material such as cotton, rayon, nylon, polyester, polycarbonate, wire, etc. With the advent of the polyester and polycarbonate fibers, it was necessary to develop a better adhesive system and attempts were made by adding resin-forming reactants to the rubber which would react to form a resin in-situ under proper conditions of heat.

However, it was soon observed that under certain conditions of vulcanization, the resin was slow to form, or failed to form the desired reaction product. To speed up the proper formation of the resin, the use of a catalyst was necessary but it was observed that just any catalyst could not be used but only those that did not destroy the desirable physical properties of the vulcanized rubber and further did not destroy the reinforcing fiber especially under those conditions where the rubber and fiber were subjected to aging, especially under the influence of heat.

It has now been discovered that the formation of a resin in-situ from a methylene acceptor and a methylene donor during the heat treatment of a rubber being reinforced thereby may be accelerated to form a desirable reaction product between acceptor and the donor by adding to the rubber a sterically hinder $BF_3$ complex of an organic compound containing at least one 3 valent nitrogen.

In all references to the $BF_3$ complexes the carbon constituent is designated as primary

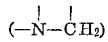

secondary

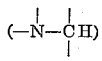

and tertiary

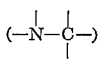

when hydrogens are present as indicated.

The sterically hindered $BF_3$ complexes of this invention have the general formula:

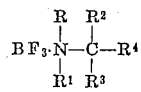

wherein the R radicals are selected from the group consisting of hydrogen and primary, secondary or tertiary carbon atoms. When R and $R^1$ are hydrogen the $BF_3$ complex is one of a primary amine and the alpha carbon in the above general formula attached to the nitrogen may be either a tertiary or a primary carbon. When the carbon is primary then it in turn must be connected to at least one tertiary carbon.

$BF_3$ complexes of the following primary amines have been found to be useful in catalyzing the reaction of a methylene donor with a methylene acceptor during heat treatment of these methylene compounds in a rubber stock. In the general formula above where R and $R^1$ are hydrogen then $R^2$, $R^3$ and $R^4$ may be an alkyl radical containing from 1 to 10 carbon atoms. When $R^2$, $R^3$ and $R^4$ are methyl the resulting primary amine is tertiary butylamine and tertiary octylamine. When $R^2$ and $R^3$ in the general formula above is hydrogen then $R^4$ is a tertiary carbon and the resulting compound may be represented by the general formula:

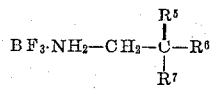

wherein $R^5$, $R^6$ and $R^7$ may be any alkyl radical having from one to eight carbon atoms. When $R^5$, $R^6$ and $R^7$ are methyl the resulting primary amine is neopentylamine.

Complexes of $BF_3$ with certain secondary amines are excellent catalysts of the methylene donor-acceptor resins used in cord reinforced rubber compounds and also provide excellent aging. In the first general formula where R is hydrogen and $R^1$ is carbon the two resulting alpha carbon atoms can be secondary or tertiary. When both carbon atoms are secondary the resulting amines may be diisopropylamine, dicyclohexylamine, isopropylcyclohexylamine and isopropylpseudocumidine. An example of an amine in which both alpha carbon atoms are tertiary is ditertiarybutylamine.

In addition, the $BF_3$ complex can be one of a secondary amine having the general formula:

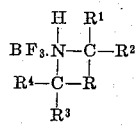

wherein $R^1$, $R^2$, $R^3$ and $R^4$ may be hydrogen or carbon and wherein R is 0 to 4 hydrocarbon linkages such as (—$CH_2$—). Thus in this secondary amine there are two alpha carbons attached to the nitrogen and these alpha carbons may be either primary or secondary. Examples of these cyclic amines are piperidine, pyrrolidine, and ethyleneimine.

When the alpha carbon atoms are primary and not in a ring then they must be attached to a tertiary carbon atom. Under these conditions where the two alpha carbon atoms are primary carbons, the general formula of the $BF_3$ complex of this type of secondary amine has the following general formula:

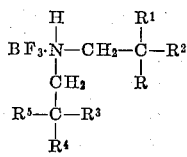

wherein R, $R^1$, $R^2$, $R^3$, $R^4$ and $R^5$ are alkyl radicals containing from 1 to 10 carbon atoms. An example of this type of secondary amine that may be complexed with $BF_3$ is dineopentylamine.

When in the general formula first identified above R and $R^1$ are carbon then the $BF_3$ complex is one of a tertiary amine and has the following general formula:

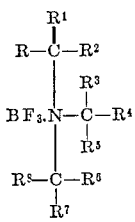

wherein R, $R^1$, $R^2$, $R^3$, $R^4$, $R^5$, $R^6$, $R^7$ and $R^8$ may be hydrogen or carbon. In this formula there are three alpha carbon atoms attached to the nitrogen and these carbon atoms may be primary, secondary or tertiary carbon atoms. These alpha carbon atoms may be a carbon atom in any aliphatic radical containing from 1 to 10 carbon atoms. Examples of $BF_3$ complexes of tertiary amines are N,N,N-trimethylamine; N,N,N-triethylamine; N,N,N-tri-n-propylamine; and N,N,N-tri-isopropylamine.

It is generally observed from the examples indicated above that in the $BF_3$ complexes of primary amines where the alpha carbon is a tertiary carbon this same grouping may be used to form the secondary amine.

When the primary amine has an alpha primary carbon which in turn is connected to a beta tertiary carbon atom, this same grouping may also be used in forming a secondary amine. In the secondary amine where the two alpha carbons are secondary carbons attached in turn to methyl groups to satisfy the two valencies of each of the secondary carbons, a third group of this nature may be substituted on the nitrogen to form a tertiary amine. Other similar relationships may be observed from the foregoing examples of primary, secondary and teritary amines disclosed as useful in making $BF_3$ complexes thereof as catalysts in the promotion of the rapid reaction of the methylene donor and methylene acceptor used in forming the resin in situ in an environment of rubber.

A tertiry cyclic amine used in forming the $BF_3$ complex useful in this invention is N-isopropylpiperidine. Other cyclic nitrogen containing compounds that show some catalytic activity innclude the $BF_3$ complexes of pyridine, 2,6 - dimethylmorpholine, morpholine and diphenylguanidine.

All sterically hindered amine $BF_3$ complexes described heretofore with the exception of $BF_3$ trialkylamines and $BF_3$ cyclic secondary amines constitute the rare class of $BF_3$ sterically hindered amine complexes.

Preparation of some of the new $BF_3$ complexes successful in this invention is described:

EXAMPLE 1

Diisopropylamine _____ moles__ 7.0
Petroleum ether (anhydrous) _____ liters__ 5.0

$BF_3$ was bubbled through the amine-petroleum ether solution 3 hours while maintaining the temperature at 20 to 30° C. using an ice bath. The white crystalline product was quickly filtered and dried. It was hygroscopic. Yield 94%. Boron; 6.14%. Found 6.38%.

EXAMPLE 2 t-Butylamine _____ moles__ 0.67
Petroleum ether _____ liters__ 0.45

$BF_3$ was bubbled through the amine-petroleum ether solution 20 minutes at 15 to 35° C. White crystalline product was filtered and dried; MP 127–139° C. Yield 91%. Nitrogen 10.0%. Found 9.91%.

EXAMPLE 3 t-Octylamine _____ moles__ 0.42
Petroleum ether _____ liters__ 0.40

$BF_3$ was bubbled through the amine-ether solution 20 minutes at 15 to 35° C. White crystalline product filtered and dried; MP 72–74° C. Yield 77%. Nitrogen 7.15%. Found 6.89%.

Most methylene donors capable of generating methylene groups in the presence of a methylene acceptor to form a resin in the rubber will develop a satisfactory bond between the rubber and the fiber when given sufficient time. Under accelerated conditions now employed to shorten the time necessary to vulcanize rubber in the production of such articles as pneumatic tires, pressure hose and drive belts, the time is so short that the articles are removed from their molds before the donor and the acceptor have completed their reaction involved in forming the resin. As a result, optimum properties are not developed either in the rubber or in the bond between the rubber and the reinforcing cord used in making these articles.

Any of the well-known methylene donors may be used in the present invention and respond favorably to the influence of the $BF_3$ complexes of the present invention in regard to reacting with the methylene acceptors in a shortened period of time. Well-known donors are hexamethylenetetramine, paraformaldehyde, donors containing at least one 3-valent nitrogen connected to at least one $CH_2$ radical and wherein the remaining valence of the $CH_2$ radical is connected to any oxy radical (—OX) wherein X is a radical selected from the group consisting of hydrogen to form a methylol group (—$CH_2OH$), or a lower alkyl (1–10C) to form an alkoxymethyl group (—$CH_2OR$). Examples of methylene donors by class include N-(substituted oxymethyl) derivatives of urea, including N-(substituted oxymethyl) imidazolidines, and N-(substituted oxymethyl) hydantoins, and N-(substituted oxymethyl) melamines. Other examples of ureas include 1,3 - dimethylolthiourea; 1,3 - dimethylolurea; 1,3-dimethylol-1-methylthiourea; 1,3 - dimethylol - 1,3 - dimethylurea; 1,3 - dimethylol - 1,3 - dibutylurea; 1,3-dimethylol - 1,3 - diisobutylthiourea, and 1 - methylol-1,3,3'-trimethylurea. Examples of imidazolidines are N-(substituted oxymethyl) imidazolidinethione; 1,3 - dimethylol - 2 - imidazolidinone, and 1 - methylol - 3-methyl - 2 - imidazolidinethione. Examples of hydantoins are 1 - methylol - 5,5' - dimethylhydantoin; 3-methylol-5,5' - dimethylhydantoin; 1,3 - dimethylol - 5,5'-dimethylhydantoin; and 1 - methylol - 5,5' - dibutylhydantoin. Examples of melamines are hexakismethoxymethylmelamine; N,N',N" - trimethyl - N,N',N" - trimethylolmelamine; hexamethylolmelamine; N,N',N" - trimethylolmelamine; N-methylolmelamine; N,N' - dimethylolmelamine; N,N',N" - triethyl - N,N',N" - tris(methoxymethyl)melamines; and N,N',N" - tributyl - N,N',N" - trimethylolmelamine. Other methylene donors include cyclotrimethylenetriamine in which each of the three nitrogens is substituted with an alkyl radical having one to eight carbon atoms, allyl, cyclohexyl, benzyl, alkoxyalkyl having one to eight carbon atoms in each alkyl group and dialkylaminoalkyl having one to eight carbon atoms in each alkyl group, diaminomethane in which each of the two nitrogens is substituted with an alkyl radical having 1 to 8 carbon atoms, cyanomethyl, allyl, cyclohexyl or benzyl or where two of the substituents on the same nitrogen together with the nitrogen will form a hexamethylene imino radical, morpholyl radical, piperidyl radical or a piperizyl radical, N,N'-disubstituted hexahydropyrimidines wherein the substituents on the nitrogen atoms may be alkyl radicals having 1 to 8 carbon atoms, phenyl or benzyl. Other methylene donors include the azomethines, examples being t-butylazomethine; t-octylazomethine; and neopentyldimethylcarbinylazomethine; alpha, alpha-dimethylbenzylazomethine; triphenylmethylazomethine; alpha,, alpha-diphenylbenzylazomethine; tribenzylmethylazomethine; tri - (2 - phenylethyl) methylazomethine as well as 1,8 - di(methyleneamino) - p-methane. Other methylene donors include N-methylolcarboxylic acid amides examples being N-methylolacetamide; N-methylolbutyramide; N - methylolacrylamide; N-methylolmethacrylamide; as well as the N-methylolcyclicamides of dicarboxylic acid including N-methylolsuccinimide; N-methylolmaleimide; N - methylolitaconimide; N - methylolcitraconimide; N - methylolphthalimide; N - methylolhexahydrophthalimide; N - methylol - 1,2,3,6-tetrahydrophthalimide; N-methylol - 3,6 - endomethylene - Δ⁴-tetrahydrophthalimide. Another methylene donor is a triazone formaldehyde specifically identified as 1,3 - dimethylol-5-substituted hexahydrotriazin - 2 - one, wherein the substituent is selected from the group consisting of alkyls having one to eight carbon atoms and cycloalkyls. Further methylene donors include trimeric methyleneaminoacetylnitrile as well as the 1 - azo - 3,7 - dioxybicyclo [3.3.0] octanes including 1 - azo - 5 - methyl-3,7-dioxybiclo [3.3.0] octane; 1-azo-5-ethyl - 3,7 - dioxybicyclo [3.3.0] octane; and 1 - azo - 5 - methylol - 3,7 - dioxybicyclo [3.3.0] octane.

Each of the methylene donors described above will form a resin in situ in the rubber when reacted with any one or combination of the following methylene acceptors; resorcinol, m-aminophenol, resorcinol monoacetate, resorcinol diacetate and other m-disubstituted benzenes wherein the substituents may be hydroxy (—OH), amino (—NH₂), or acetoxy (—OCCH₃) radicals, as well as 1,5-naphthalenediol, phenol, alpha and beta naphtha resins resulting from the partial reaction of the foregoing acceptors with formaldehyde. Other acceptors include o-disubstituted benzenes such as o-aminophenol, melamine and the partial reaction products of dicarboxylic acids such as phthalic, isophthalic and terephthalic acids with phenols, such as phenol, resorcinol, o-aminophenol and m-aminophenol and partial reaction products of urea, aniline, m-phenylenediamine and p-phenylenediamine.

Any of the reinforcing fibers used in reinforcing rubber may be used in the present invention and of particular value are the polyester and the polycarbonate fibers because of their high strength which is retained even at high temperatures with little tendency to stretch. The polyester and the polycarbonate fiber are easily attacked by most primary amines unless sterically hindered causing molecular scission; therefore, it is important in the compounding of rubber to eliminate those materials which form by-products having sterically unhindered primary amine characteristics. The polyester reinforcing fibrous structures are prepared from fiber-forming thermoplastic linear high molecular weight condensation polyester filaments and those polyesters made particularly from polyethyleneterephthalate as well as polymers of cyclohexanedimethyleneterephthalate. By linear terephthalate polyesters is meant a linear condensation polyester comprising recurring glycoldicarboxylate structural units in which at least about 85% of the recurring structural units are units of the formula

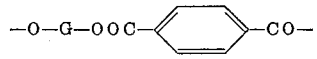

wherein G represents a divalent organic radical containing from about 2 to 8 carbon atoms which is attached to the adjacent oxygen atoms by saturated carbon atoms. The terephthalate radical may be the sole dicarboxylate constituent of the recurring structural units or up to about 15% of the structural units may contain other dicarboxylate radicals such as adipate, sebacate, isophthalate; 4,4' - dibenzoate and hexahydroterephthalate. By high molecular weight is meant polyesters having an intrinsic viscosity of at least 0.4 and preferably 0.6 to 1.0 and as high as 1.5 as measured in a 60/40 phenol/tetrachloroethane mixed solvent at 30° C.

The rubber component of the laminate of this invention is a rubber having a glass transformation temperature below 25° C. The rubber component is also a stretchable composition having a tendency to return to its approximate original shape after being vulcanized and particularly is a rubber that is used in the manufacture of tires, drive belts or pressure hose. Thus, the laminate of this invention may involve natural rubber otherwise known as *Hevea brasiliensis*, or conjugated diene polymeric rubbers made by polymerizing butadiene-1,3, isoprene, 2,3-dimethyl butadiene-1,3 and mixtures of these conjugated dienes as well as copolymers of these diene monomers with up to 50% of compounds which contain a CH₂:C: group and which are copolymerizable with butadiene-1,3 where, for example, at least one of the valencies is attached to an electro negative radical, that is a radical which increases the polar character of the molecules such as vinyl, phenol, nitrile and carboxy radicals. Examples of the diene rubbers are polybutadiene, stereospecific polybutadienes, particularly those with a cis-1,4 content of at least 90%; polyisoprene, stereospecific polyisoprenes particularly those with a cis-1,4 content of at least 90%, butadiene/styrene copolymers, also known as SBR and butadiene/acrylonitrile copolymers also known as NBR.

The rubber being bonded to the reinforcing element in the presence of an in situ resin will contain conventional compounding and vulcanizing ingredients such as carbon black, antioxidants, sulfur, zinc oxide, accelerators and rubber processing and softening oils which may be added as such or may be prepared from oil extended rubbers. These compounding ingredients together with the methylene donor and the methylene acceptor as well as the BF₃ complex catalyst may be added to the rubber in any conventional manner as by mixing in a Banbury or on an open mill.

The following example illustrates the best mode in which the invention may be performed. All parts are by weight unless otherwise identified.

*Example 1*

The following six formulas were used to exemplify the unexpected advantages obtained in compounding natural rubber and a rubbery copolymer of styrene and butadiene-1,3 with a sterically hindered BF₃ nitrogen containing organic compound.

| Examples | Control | 1 | 2 | 3 | 4 | 5 | Range |
|---|---|---|---|---|---|---|---|
| 1. Natural Rubber | 60.0 | 60.0 | 60.0 | 60.0 | 60.0 | 60.0 | 0–100 |
| 2. OE/SBR [1] | 55.0 | 55.0 | 55.0 | 55.0 | 55.0 | 55.0 | 100–0 |
| 3. Carbon Black | 50.0 | 50.0 | 50.0 | 50.0 | 50.0 | 50.0 | 10–60 |
| 4. Pine Tar | 5.0 | 5.0 | 5.0 | 5.0 | 5.0 | 5.0 | 2–10 |
| 5. Stearic Acid | 2.0 | 2.0 | 2.0 | 2.0 | 2.0 | 2.0 | .1.5–3 |
| 6. Antioxidant [2] | 1.0 | 1.0 | 1.0 | 1.0 | 1.0 | 1.0 | .5–3 |
| 7. Methylene Acceptor (Resorcinol) | | | 1 | | 1 | 1 | .1–10 |
| 8. Methylene Donor [3] | | | | 1.5 | 1.5 | 1.5 | .1–10 |
| 9. Catalyst [4] | | 1 | | | | 1 | .05–5 |
| 10. Pri. Accelerator [5] | 1.2 | 1.2 | 1.2 | 1.2 | 1.2 | 1.2 | .5–3 |
| 11. Sec. Accelerator [6] | .15 | .15 | .15 | .15 | .15 | .15 | .05–1.5 |
| 12. ZnO | 4.0 | 4.0 | 4.0 | 4.0 | 4.0 | 4.0 | 2–10 |
| 13. Sulfur | 2.50 | 2.50 | 2.50 | 2.50 | 2.50 | 2.50 | 1–5 |
| | 180.85 | 181.85 | 181.85 | 182.35 | 183.75 | 184.35 | |

[1] OE/SBR (styrene/butadiene-1,3 25/75 copolymer) (plus 37½ parts oil per 100 of SBR).
[2] Alkylated phenol paraphenylene diamine.
[3] Hexakismethoxymethylmelamine.
[4] Diisopropyl amine BF₃ complex.
[5] Benzothiazyl disulfide.
[6] Tetramethylthiuram disulfide.

In compounding the rubber stock in accordance with the formulation above, a masterbatch of ingredients 1 and 2 are made with the carbon black on a mill at a temperature of about 100° C. The resulting carbon black masterbatch is then cooled and the remaining compounds are added to the batch in the order indicated above in a Banbury at a temperature of about 70° C. The control rubber was prepared in a similar manner except that a methylene acceptor, a methylene donor and a catalyst were not added. Then the acceptor and the donor were added, the mole ratio of acceptor to donor may range from 1/1 to 1/6 per 100 parts of rubber and preferably in such ratio as to use up each resin forming component in forming the resin in situ. When the $BF_3$ sterically hindered catalyst is added, it may be added in amounts ranging from about .05 to about 5.0 parts per 100 parts of rubber. It is preferred to add the catalyst in an amount from about .5 to about 1.5 parts and more preferably from about .75 to about 1.25 parts per 100 parts of rubber being processed.

The following Table I sets forth the various physical properties of the 6 different rubber stocks tested in accordance with known A.S.T.M. test standards where available with the unexpected results of this invention being shown under the heading of Example 5.

TABLE I

| Examples | Control | 1 | 2 | 3 | 4 | 5 |
|---|---|---|---|---|---|---|
| Cure 80′/275° F.: | | | | | | |
| 300 Modulus | 1,350 | 1,500 | 1,200 | 1,350 | 1,375 | 1,700 |
| Tensile | 2,100 | 1,950 | 2,100 | 1,450 | 1,650 | 2,200 |
| Elongation | 430 | 375 | 460 | 420 | 360 | 370 |
| Hot Rebound | 85.4 | 85.4 | 83.6 | 85.4 | 84.5 | 86.0 |
| Hot Deflection | .280 | .275 | .278 | .276 | .280 | .265 |
| Dynamic Modulus | 63.9 | 66.0 | 64.9 | 59.0 | 65.4 | 75.4 |
| Hot U Adhesion | | | | | | |
| Dipped Polyester | 16.0 | 14.7 | 21.4 | 20.6 | 25.3 | 24.8 |
| Undipped Polyester | 2.6 | 3.6 | 2.0 | 2.1 | 3.6 | 7.5 |
| Dipped Nylon | 16.3 | 16.8 | 15.1 | 10.9 | 15.9 | 19.1 |
| Undipped Nylon | 6.1 | 5.7 | 5.6 | 3.5 | 6.9 | 8.2 |

M300 (ASTM Test #D412)

| | Control | 1 | 2 | 3 | 4 | 5 |
|---|---|---|---|---|---|---|
| 5′/310° F | 800 | 1,075 | 650 | 675 | 625 | 900 |
| 8′/310° F | 1,075 | 1,275 | 875 | 1,000 | 1,375 | 1,150 |
| 15′/310° F | 1,200 | 1,275 | 1,100 | 1,150 | 1,175 | 1,600 |
| 40′/275° F | 1,250 | 1,450 | 1,050 | 1,075 | 1,050 | 1,265 |
| 80′/275° F | 1,350 | 1,500 | 1,200 | 1,350 | 1,375 | 1,700 |
| 120′/275° F | 1,350 | 1,500 | 1,200 | 1,350 | | 1,800 |

Tensile (ASTM Test #D412)

| | Control | 1 | 2 | 3 | 4 | 5 |
|---|---|---|---|---|---|---|
| 5′/310° F | 1,950 | 2,350 | 2,200 | 2,050 | 2,050 | 2,100 |
| 8′/310° F | 2,400 | 2,000 | 2,150 | 1,900 | 1,950 | 2,700 |
| 15′/310° F | 2,050 | 1,650 | 2,000 | 1,450 | 2,100 | 2,300 |
| 40′/275° F | 2,250 | 2,100 | 2,750 | 1,850 | 2,150 | 2,300 |
| 80′/275° F | 2,100 | 1,950 | 2,100 | 1,450 | 1,650 | 2,200 |
| 120′/275° F | 2,050 | 1,600 | 1,550 | 1,550 | 1,400 | 2,200 |

Elongation (ASTM Test #D412)

| | Control | 1 | 2 | 3 | 4 | 5 |
|---|---|---|---|---|---|---|
| 5′/310° F | 540 | 525 | 620 | 600 | 650 | 540 |
| 8′/310° F | 535 | 420 | 550 | 465 | 450 | 580 |
| 15′/310° F | 440 | 360 | 470 | 370 | 320 | 410 |
| 40′/275° F | 475 | 400 | 520 | 425 | 510 | 410 |
| 80′/275° F | 430 | 375 | 460 | 420 | 360 | 370 |
| 120′/275° F | 420 | 310 | 375 | 430 | 280 | 360 |

Cold Rebound (ASTM Test #D1054)

| | Control | 1 | 2 | 3 | 4 | 5 |
|---|---|---|---|---|---|---|
| 18′/310° F | 76.5 | 77.6 | 76.5 | 77.6 | 74.1 | 77.0 |
| 25′/310° F | 76.5 | 77.0 | 75.8 | 77.0 | 74.1 | 76.5 |
| 95′/275° F | 77.6 | 76.6 | 77.6 | 77.6 | 75.8 | 78.2 |

Cold Deflection (ASTM Test #D1054)

| | Control | 1 | 2 | 3 | 4 | 5 |
|---|---|---|---|---|---|---|
| 18′/310° F | .268 | .263 | .267 | .270 | .274 | .257 |
| 25′/310° F | .270 | .262 | .265 | .270 | .274 | .259 |
| 95′/275° F | .260 | .255 | .257 | .260 | .260 | .251 |

Hot Rebound (ASTM Test #D1054)

| | Control | 1 | 2 | 3 | 4 | 5 |
|---|---|---|---|---|---|---|
| 18′/310° F | 84.8 | 86.0 | 83.0 | 85.4 | 83.0 | 84.4 |
| 25′/310° F | 84.8 | 85.4 | 83.0 | 84.8 | 83.0 | 86.0 |
| 95′/275° F | 85.4 | 86.0 | 83.6 | 85.4 | 84.2 | 86.0 |

Hot Deflection (ASTM Test #D1054)

| Examples | Control | 1 | 2 | 3 | 4 | 5 |
|---|---|---|---|---|---|---|
| 18′/310° F | .283 | .280 | .287 | .286 | .293 | .276 |
| 25′/310° F | .287 | .280 | .291 | .287 | .297 | .273 |
| 95′/275° F | .280 | .275 | .278 | .276 | .280 | .265 |

Dynamic Modulus (ASTM D1053-54T)

| | Control | 1 | 2 | 3 | 4 | 5 |
|---|---|---|---|---|---|---|
| E: | | | | | | |
| 8′/310° F | 51.0 | 54.1 | 46.6 | 43.7 | 46.6 | 55.0 |
| 15′/310° F | 54.1 | 54.6 | 55.8 | 49.4 | 55.8 | 61.5 |
| 80′/275° F | 63.9 | 66.0 | 64.9 | 59.0 | 65.4 | 75.4 |
| N: | | | | | | |
| 8′/310° F | 12.0 | 12.0 | 15.1 | 11.6 | 13.8 | 12.8 |
| 15′/310° F | 12.0 | 11.6 | 14.2 | 11.6 | 12.9 | 12.5 |
| 80′/275° F | 12.5 | 12.9 | 15.1 | 11.6 | 13.3 | 13.3 |
| R: | | | | | | |
| 8′/310° F | 56.7 | 58.6 | 45.9 | 52.7 | 49.0 | 59.1 |
| 15′/310° F | 58.6 | 60.0 | 54.2 | 56.7 | 57.3 | 61.2 |
| 80′/275° F | 62.4 | 62.4 | 57.0 | 62.3 | 61.2 | 65.3 |
| Hx: | | | | | | |
| 8′/310° F | 57 | 58 | 65 | 53 | 61 | 58 |
| 15′/310° F | 58 | 56 | 66 | 55 | 61 | 61 |
| 80′/275° F | 62 | 64 | 72 | 57 | 65 | 67 |
| Hf: | | | | | | |
| 8′/310° F | 98 | 88 | 133 | 124 | 126 | 86 |
| 15′/310° F | 88 | 84 | 94 | 101 | 88 | 73 |
| 80′/275° F | 68 | 66 | 76 | 73 | 68 | 53 |

Hot U (IRW 114, 213 (1946) For Test)

| | Control | 1 | 2 | 3 | 4 | 5 |
|---|---|---|---|---|---|---|
| Dipped Polyester: | | | | | | |
| 8′/310° F | 26.2 | 23.8 | 24.6 | 25.0 | 23.6 | 28.6 |
| 15′/310° F | 23.9 | 23.7 | 24.7 | 19.9 | 20.7 | 19.6 |
| 40′/275° F | 23.8 | 18.9 | 22.2 | 21.4 | 25.9 | 22.1 |
| 80′/275° F | 20.4 | 20.0 | 17.6 | 19.8 | 26.5 | 24.1 |
| 120′/275° F | 16.0 | 14.7 | 21.4 | 20.6 | 25.3 | 24.8 |
| 17′/330° F | 17.1 | 16.0 | 26.2 | 23.3 | 19.3 | 22.4 |
| 20′/350° F | 15.3 | 19.2 | 18.2 | 14.2 | 15.1 | 15.5 |
| Undipped Polyester: | | | | | | |
| 8′/310° F | 6.3 | 5.3 | 5.4 | 5.5 | 5.5 | 7.0 |
| 15′/310° F | 3.8 | 6.3 | 5.6 | .3.0 | 5.2 | 2.9 |
| 40′/275° F | 6.2 | 3.4 | 3.4 | 2.3 | 3.5 | 8.0 |
| 80′/275° F | 2.6 | 3.6 | 2.0 | 2.1 | 3.6 | 7.5 |
| 120′/275°/ F | 5.2 | 2.8 | 9.0 | 6.9 | 3.4 | 7.6 |
| 17′/330° F | 4.2 | 1.6 | 6.2 | 4.7 | 3.4 | 4.4 |
| 20′/350° F | 2.7 | 4.2 | 2.0 | 1.6 | 2.3 | 2.2 |
| Dipped Nylon: | | | | | | |
| 8′/310° F | 20.6 | 18.4 | 20.2 | 20.8 | 16.1 | 16.1 |
| 15′/310° F | 19.2 | 14.1 | 20.8 | 11.8 | 12.7 | 14.6 |
| 40′/275° F | 24.7 | 17.3 | 21.4 | 20.1 | 21.7 | 20.8 |
| 80′/275° F | 16.3 | 16.8 | 15.1 | 10.9 | 15.9 | 19.1 |
| 120′/275° F | 17.9 | 15.0 | 12.8 | 9.7 | 13.7 | 15.5 |
| 17′/330° F | 18.8 | 18.3 | 23.2 | 17.0 | 20.3 | 18.3 |
| 20′/350° F | 16.9 | 18.7 | 17.1 | 12.3 | 16.0 | 17.6 |
| Undipped Nylon: | | | | | | |
| 8′/310° F | 4.3 | 5.1 | 5.4 | 3.6 | 6.3 | 7.0 |
| 15′/310° F | 6.1 | 4.9 | 5.1 | 4.0 | 5.6 | 6.8 |
| 40′/275° F | 4.2 | 5.2 | 6.3 | 3.8 | 5.6 | 7.4 |
| 80′/275° F | 6.1 | 5.7 | 5.6 | 3.5 | 6.9 | 8.2 |
| 120′/275° F | 4.8 | 6.6 | 7.0 | 6.1 | 7.0 | 7.1 |
| 17′/330° F | 4.9 | 4.8 | 5.7 | 4.6 | 5.9 | 6.9 |
| 20′/350° F | 4.6 | 5.0 | 3.2 | 3.7 | 9.8 | 7.8 |

In the examples above the polyester reinforcing cord identified is a tire cord made by first twisting 1100 denier yarn at the rate of 12 turns per inch and then twisting three of these singles at the rate of 12 turns per inch to form a cord. The cord is made of polyethylene teraphthalate filaments having a melting point of 260° C. and an intrinsic viscosity of 0.68. The polyamide cord is made in the same way as described for the polyester cord with the exception that conventional nylon 66 filaments were used.

In the examples above where the cord is indicated as being dipped, the dip is a conventional R/F/L adhesive containing 20% solids and made according to the following formula:

R/F/L ADHESIVE

| Ingredients: | Parts (by weight) |
|---|---|
| Resorcinol | 1.68 |
| Formaldehyde (37%) | 2.16 |
| Sodium hydroxide (10%) | 2.04 |
| Terpolymer rubber latex of styrene butadiene-1,3/vinylpyridine 15/70/15 (41%) | 12.90 |
| Copolymer rubber latex of styrene butadiene-1,3 (39%) | 25.20 |
| Water | 56.02 |

The cord is dipped in the above adhesive by passing the cord through the adhesive dip at such a rate as to deposit on the surface of the cord between about 5% to 10% adhesive solids, and then drying the adhesive on the cord at a temperature of about 350° F. for 2 minutes, followed by a second heat treatment at about 425° F. for about 40 seconds.

In Example 5 above the catalyst was the diisopropylamine $BF_3$ complex; however, any of the $BF_3$ complexes described heretofore may be used in the examples above to produce the desirable results shown for Example 5. By lower (1–10C) alkyl radicals used in describing the various $BF_3$ complexes is meant methyl, ethyl, propyl (n-and iso), butyl (n-sec, -iso, and tert-), amyl (n-sec, -iso, and tert-), hexyl e.g. n-hexyl, sec-hexyl, 2,2-dimethyl-3-butyl, 2,2-dimethyl-4-butyl, 2,3-dimethyl-2-butyl, 2-methyl pentyl, 2-methyl-2-pentyl, 3-methyl-1-pentyl, 3-methyl-2-pentyl, etc., hexyl, n-heptal, sec. heptal, 2,3-dimethyl - 3 - 4 - dimethyl - 2' - pentyl, 2,4 - dimethyl - 3-pentyl, 2,2,3-dimethyl-3'-butyl-3-ethyl-2-pentyl, 2-methyl-2-hexyl, etc., octyl e.g. n-octyl, 2-ethyl-hexyl, and 2,2,4,4-tetramethylbutyl.

The rubber compositions of this invention containing the combination of various compounding ingredients as indicated in the examples above and containing the catalyst of this invention useful in catalyzing the reaction of the methylene donor with the methylene acceptor in forming a resin in situ in the rubber under the conditions used in vulcanizing a rubber alone or in combination with reinforcing cords of the nature hereinbefore described is particularly useful in the manufacture of pneumatic tires, pressure hose and drive belts particularly wherein the rubber is subjected to severe forces to the extent that the rubber must be reinforced with a rubber reinforcing agent and an exceptional bond must be maintained between the rubber and the reinforcing cord and the bond must be formed in a minimum of time using the conditions required to bring about the vulcanization of the rubber using the compounding ingredients indicated above without having detrimental effects upon the rubber itself or detrimental effects upon the cord being used to reinforce the rubber especially the cord made from a polyester which is sensitive to amine by-products that might result from the decomposition of the materials used in compounding the rubber. The sterically hindered $BF_3$ complexes of an organic compound containing at least one 3-valentnitrogen is admirably adapted as a catalyst to hasten the reaction of the methylene donor with the methylene acceptor under the heating conditions required in bringing about the vulcanization of the rubber to form the proper resin in the rubber during the vulcanization period and bring about a proper bond with the cord being used to reinforce the rubber, and the rubber being reinforced by the cord without producing any by-products during the reaction which under certain conditions of aging encountered in the use of the article being manufactured such as a pneumatic tire will not degrade the reinforcing cord particularly when made of a polyester or a polycarbonate.

While certain representative embodiments and details have been shown for the purpose of illustrating the invention, it will be apparent to those skilled in this art that various changes and modifications may be made therein without departing from the spirit or scope of the invention.

What is claimed is:

1. In a rubber compound containing a reinforcing element, a methylene donor and a methylene acceptor capable of reacting with the donor to form a resin in situ, the improvement which comprises adding to the compound a sterically hindered $BF_3$ complex having the general formula:

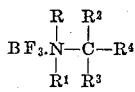

wherein R, $R^1$, $R^2$, $R^3$ and $R^4$ are radicals selected from the group consisting of hydrogen and alkyl radicals having from 1 to 10 carbon atoms, and when R and $R^1$ are hydrogen then the alpha carbon is selected from the group consisting of primary and tertiary, and when said alpha carbon is primary then it is connected to a tertiary carbon, when R is hydrogen and $R^1$ is carbon then the two alpha carbons are selected from the group consisting of primary, secondary and tertiary, both alpha carbons may form a saturated ring connected through not more than 4 carbons, and when said alpha carbons are primary, then they are in turn connected to a tertiary carbon and may be in a non-cyclic amine, when R and $R^1$ form two additional alpha carbon atoms then the alpha carbons are connected to a carbon atom selected from the group consisting of primary, secondary and tertiary.

2. The rubber compound of claim 1 wherein the methylene donor is selected from the group consisting of hexamethylenetetramine, paraformaldehyde, and compounds containing at least one 3-valent nitrogen connected to at least one $CH_2$ radical and wherein the remaining valence of the $CH_2$ radical is connected to an oxy radical (—OX) wherein X is a radical selected from the group consisting of hydrogen to form a methylol group (—$CH_2OH$), or a lower alkyl radical containing one to ten carbon atoms to form an alkoxymethyl group (—$CH_2OR$).

3. The resin reinforced compound of claim 11 wherein the catalyst is selected from the group consisting of $BF_3$ diisopropylamine, $BF_3$ tert-butylamine, $BF_3$ tert-octylamine, $BF_3$ piperidine, $BF_3$ tri-n-butylamine, $BF_3$ amine complex having the general formula:

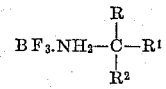

wherein the alpha carbon is tertiary and R, $R^1$ and $R^2$ are the same or different alkyl radicals having from 1 to 10 carbon atoms, and a $BF_3$ amine complex having the general formula:

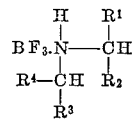

wherein $R^1$, $R^2$, $R^3$ and $R^4$ are the same or different alkyl radicals having from 1 to 10 carbon atoms.

4. The rubber compound of claim 1 wherein the complex has the general formula:

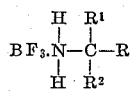

wherein R, $R^1$ and $R^2$ are hydrogen or alkyl radicals having from 1 to 10 carbon atoms, and the alpha carbon is selected from the group consisting of tertiary and primary and when said alpha carbon is primary then it is connected to a tertiary carbon.

5. The rubber compound of claim 1 wherein the complex has the general formula:

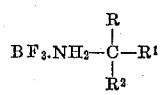

wherein the alpha carbon is a tertiary carbon and R, $R^1$ and $R^2$ are the same or different alkyl radicals having from 1 to 10 carbon atoms.

6. The rubber compound of claim 1 wherein the $BF_3$ complex has the general formula:

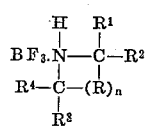

wherein $R^1$, $R^2$, $R^3$, and $R^4$ are selected from the group consisting of hydrogen and alkyl radicals having from 1 to 10 carbon atoms and wherein R is a hydrocarbon linkage, and $n$ is a whole number not greater than 4.

7. The rubber compound of claim 1 wherein the $BF_3$ complex has the general formula:

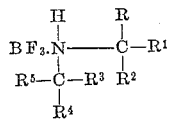

wherein the R radicals are selected from the group consisting of hydrogen and alkyl radicals having from 1 to 10 carbon atoms, and the alpha carbons are selected from the group consisting of primary, secondary and tertiary and when the alpha carbons are primary then they are in turn connected to a tertiary carbon.

8. The rubber compound of claim 1 wherein the $BF_3$ complex has the general formula:

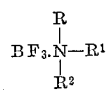

wherein R, $R^1$ and $R^2$ are alkyl radicals containing from 1 to 10 carbon atoms.

9. The rubber compound of claim 8 wherein the alkyl radicals contain from 1 to 3 carbon atoms.

10. A resin reinforced rubber compound resulting from the heat treatment of the rubber compound of claim 1.

11. A resin reinforced rubber compound resulting from the heat treatment of the compound of claim 1 wherein the methylene acceptor is resorcinol and the methylene donor is hexakismethoxymethylolmelamine.

12. The rubber compound of claim 1 wherein the catalyst is $BF_3$ diisopropylamine.

13. The rubber compound of claim 1 wherein the catalyst is $BF_3$ tert-butylamine.

14. The rubber compound of claim 1 wherein the catalyst is $BF_3$ tert-octylamine.

15. The rubber compound of claim 1 wherein the catalyst is $BF_3$ piperidine.

16. The rubber compound of claim 1 wherein the catalyst is $BF_3$ tri-n-butylamine.

17. The rubber compound of claim 1 wherein the catalyst has the general formula:

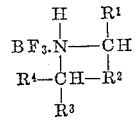

wherein $R^1$, $R^2$ $R^3$ and $R^4$ are the same or different alkyl radicals having from 1 to 10 carbon atoms.

References Cited
UNITED STATES PATENTS

| | | | |
|---|---|---|---|
| 2,769,840 | 11/1956 | Sowa | 252—433 |
| 3,252,850 | 5/1966 | Partansky | 260—59 |
| 2,425,348 | 8/1947 | Schroeder | 260—3 |
| 2,525,655 | 10/1950 | D'Ianni | 260—768 |
| 2,927,051 | 3/1960 | Buckwalter et al. | 260—51.5 |
| 2,932,671 | 4/1960 | Hager et al. | 260—3 |
| 3,194,294 | 7/1965 | Van Gils | 260—29.4 |
| 3,198,851 | 8/1965 | Hoy | 260—583 |

MURRAY TILLMAN, *Primary Examiner.*

SAMUEL H. BLECH, *Examiner.*

M. J. TULLY, *Assistant Examiner.*